United States Patent [19]
Allio

[11] Patent Number: 5,936,607
[45] Date of Patent: Aug. 10, 1999

[54] AUTOSTEREOSCOPIC VIDEO DEVICE AND SYSTEM

[76] Inventor: Pierre Allio, 81, rue de la Mare, 75020 Paris, France

[21] Appl. No.: 09/133,280

[22] Filed: Aug. 12, 1998

Related U.S. Application Data

[63] Continuation of application No. 08/535,212, Jan. 11, 1996, Pat. No. 5,808,599.

[30] Foreign Application Priority Data

May 5, 1993 [FR] France .................................. 93 05382

[51] Int. Cl.⁶ .................................................. G09G 5/36
[52] U.S. Cl. ............................. 345/139; 348/59; 359/462
[58] Field of Search ...................... 345/6, 7, 8, 9, 345/139, 150, 151; 348/42, 51, 54, 59, 60; 359/462, 463, 619, 621, 623

[56] References Cited

U.S. PATENT DOCUMENTS

| | | |
|---|---|---|
| 4,959,641 | 9/1990 | Bass et al. . |
| 5,083,199 | 1/1992 | Borner . |
| 5,099,320 | 3/1992 | Allio . |
| 5,808,599 | 9/1998 | Allio ........................................ 345/139 |

FOREIGN PATENT DOCUMENTS 791847  8/1997  European Pat. Off. .

OTHER PUBLICATIONS

R. Borner, "3D–Aufnahme–und Wiedergabeverfahren in Theorie und praktischer Anwendung", *Fernseh Und Kino Technik*, vol. 41, No.4, Apr. 1987, pp.145–149.

Patent Abstracts of Japan, JP A 04 344 795, Dec. 1, 1992, Hitachi Denshi Ltd. –vol. 17, No. 202 (E–1353) Apr. 20 1993.

*Primary Examiner*—Regina Liang
*Attorney, Agent, or Firm*—Alston & Bird LLP

[57] ABSTRACT

The invention relates to a device for display an autostereoscopic image on a video screen (20) having a cylindrical lens array (10) disposed in front of it.

The video screen (20) has pixels made up of p color points (RGB) placed horizontally side by side, the number of viewpoints for the autostereoscopic image is different from p×n (where n is a non-zero integer), and the lens_array (10) has a pitch equal to the product of the pitch of the color points (R, G, B) multiplied by the number of viewpoints, e.g. four.

19 Claims, 3 Drawing Sheets

AUTOSTEREOSCOPIC VIDEO DEVICE AND SYSTEM

CROSS-REFERENCE TO THE RELATED APPLICATIONS

This application is a continuation of application Ser. No. 08/535,212, filed Jan. 11, 1996 now U.S. Pat. No. 5,808,599.

FIELD OF THE INVENTION

The present invention relates to a device for displaying an autostereoscopic image on a video screen having a cylindrical lens array placed in front of it.

BACKGROUND OF THE INVENTION

A method and a device for producing autostereoscopic images implementing cylindrical lenses are described in U.S. Pat. No. 5,099,320 filed by the Applicant.

An image produced in this way is generally displayed by means of a television having a lens array placed in front of it, with the pitch of the array being equal to the product of the pitch of the image points or pixels multiplied by the number of viewpoints for the autostereoscopic image. In other words, each individual lens of the display lens array covers all of the color points of any pixel, and it covers four pixels for four viewpoints which are seen in succession and in complementary manner by an observer with a certain amount of magnification inherent to the lens array used, the color points being seen as having the same width as the lens. The observer therefore does not see the three components of a pixel together.

This gives rise firstly to the image points or pixels being magnified and secondly to the array pitch being visible, which pitch is equal to the width of four pixels, for example, in a display system having four viewpoints.

SUMMARY OF THE INVENTION

An object of the present invention is to provide a device making it possible to avoid, at least in part, another of the above-specified drawbacks.

To this end, the invention provides a device for displaying an autostereoscopic image on a video screen having a cylindrical lens array disposed in front of it, the device being characterized in that the video screen has pixels made up of p color points placed horizontally side by side where p is an integer greater than 1, in that the number of viewpoints for the autostereoscopic image is different from p×n (where n is a non-zero integer), and in that the lens array has a pitch equal to the product of the color point (or phosphor) pitch multiplied by the number of viewpoints.

For example, for a number of viewpoints equal to 4, the pitch of the lens array corresponds to the pitch of four juxtaposed color points.

According to the invention, the pitch of the array used is then three times smaller than the pitch of the array that would have been used in the prior art, and in addition, by using lenses at a smaller pitch, it is possible to obtain focal lengths that are smaller and to obtain observed areas that are smaller, thereby avoiding the observer perceiving the dot structures of color points and pixels on the screen. In addition, for the observer, the size ratio between color points and pixels (1/3) is preserved.

The invention also provides a method of processing an autostereoscopic image for display via a device as defined above, characterized in that it comprises a permutation step applied to the color points of pixels so that an observer sees the three color points of each pixel belonging to each viewpoint in three successive lenses of the lens array.

Said permutation of the color points can be implemented by permutation of digitized data addresses for the color points while they are being written to or read from an image color point memory.

Said color point address permutation may advantageously be implemented by means of at least one transcoding memory, for at least one line.

In a preferred implementation, the transcoding memory is input addressed by a pixel counter for each line, which counter is reset to zero at the beginning of each line, and produces, on output, for the image color point memory, permutated addresses corresponding to the permutations of the red, green, and blue color points respectively. The image color point memory may also be write addressed by a line counter.

The invention also provides an autostereoscopic video system characterized in that it comprises:

C a device for image treatment by permutation of pixel color points; and

C a display device as defined above;

and in that said permutation is such that an observer sees the p color points of each pixel belonging to each viewpoint in p successive lenses of the lens array.

BRIEF DESCRIPTION OF THE DRAWINGS

Other characteristics and advantages of the invention appear more clearly on reading the following description given with reference to the accompanying drawings, in which.

DETAILED DESCRIPTION OF THE ILLUSTRATED EMBODIMENTS

Figure 1A:
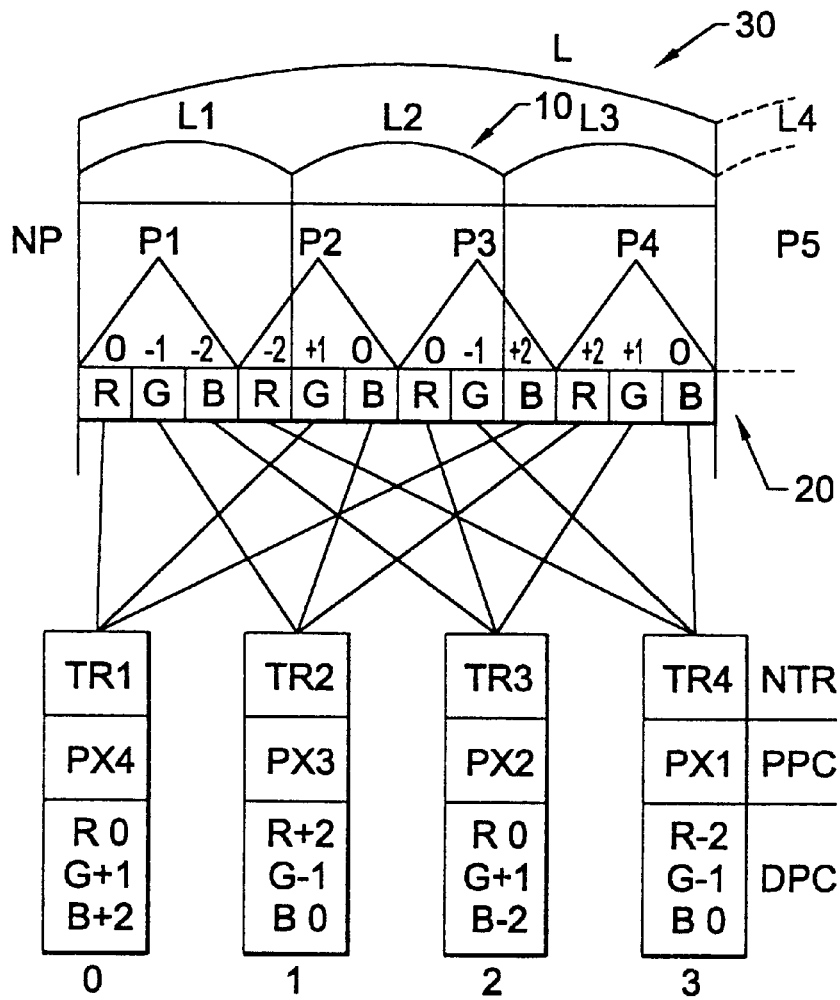
FIG. 1a shows a display device of the invention in which there can be seen, in the form of tables, the permutations of the color points for the various pixels, when there are four viewpoints and the RGB pixels are in alignment.

When a video screen is observed through a magnifying glass, it can be seen that the displayed color image is made up of a periodic succession of red (R), green (G), and blue (B) color points, which points shine more or less brightly, and the resulting color sensation is due to the three elementary components being subject to a mixing effect in the eye of the observer.

In the techniques for displaying images in relief without the use of spectacles, it is necessary to place a converging lens array in front of the screen and parallel thereto, at a distance equal to the focal length of the vertical axis convex microlenses making up the array. As a result, the microlenses of the array magnify the points horizontally and they project the visual information present on the screen to infinity.

When an observer moves parallel to the screen, blue, green, and red points are seen in succession in the reverse order to that set up by the structure of the screen (because of the inversion due to the presence of the cylindrical lenses). In the prior art, the array has lenses at a pitch corresponding to an integer multiple of the pixel pitch (in fact it is very slightly smaller than said value) and, when the observer is at the proper observation distance that corresponds to seeing solid color, i.e. color without moiré fringes, depending on the exact position of the head, the observer will see a single color over the entire screen and for each eye. However, if the observer moves closer or further away, then color moiré patterns appear, particularly when the pitch of the virtual array that can be defined as the projection from the eye of the observer of the real array onto the structure of the screen is different from that of the screen structure (three color points per pixel and n pixels per lens, where n is equal to the number of viewpoints for the stereoscopic image).

The result of this is that the color information completely or partially destroys the readability of the image, given that it is impossible to magnify a pixel without simultaneously magnifying its color components.

The idea on which the invention is based is that the above drawbacks can be remedied when the video screen has pixels made up of color points placed horizontally side by side.

The invention applies to the case where the number of viewpoints for the autostereoscopic image is different from p or a multiple of p.

According to the invention, a lens array 10 has lenses at a pitch covering more than p color points in the pixel row. In one embodiment of the invention, the lenses are at a pitch equal to that of an elementary phosphor or color point multiplied by the number of viewpoints. In the example of FIG. 1, the number of viewpoints is equal to 4. There are thus four horizontally juxtaposed pixels P1 to P4, pixel P1 corresponding in the prior art to the first viewpoint, pixel P2 to the second viewpoint, pixel P3 to the third viewpoint, and pixel P4 to the fourth viewpoint. Each of the pixels on the screen 20 has three components or color points, respectively red, green, and blue, written R, G, and B. The lens array 10 has microlenses L1, L2, L3, etc. at a pitch equal to the width occupied horizontally by four juxtaposed color points, i.e. about four-thirds of a pixel. Thus, above-mentioned pixels P1 to P4 correspond to three elementary microlenses L1, L2, and L3. The following pixels P5 to P8 corresponding to the adjacent column have, in like manner, three lenses L4, L5, and L6 corresponding thereto.

Depending on its position, the eye of an observer observing the screen 20 through the lens array 10 will see either a juxtaposition of the red component R of pixel P1, the green component G of pixel P2, and the blue component B of pixel P3, or a juxtaposition of the green component G of pixel P1, the blue component B of pixel P2, and the red component R of pixel P4, or a juxtaposition of the blue component B of pixel P1, the red component R of pixel P3, and the green component G of pixel P4, or finally a juxtaposition of the red component R of pixel P2, the green component G of pixel P3, and the blue component B of pixel P4. In other words, each eye of the observer is likely to mix visually the red, green and blue components of different pixels in the image. Naturally, the example given above with lenses L1, L2, and L3 is equally applicable to lenses L4 to L6, with pixels P5 to P8, and so on.

In this way, the observer always perceives a succession of microlenses of complementary colors distributed at a pitch over the entire screen, with the apparent pixel pitch always remaining equal to four pixels as before, in the prior art, so stereoscopic vision is not changed, but now three microlenses are required to achieve the effect, instead of a single microlens that is three times larger (an array 30 of lenses L shown in dashed lines in FIG. 1a).

As shown above, to conserve image information, it is necessary to change the position of the red, green, and blue information of images in relief presented in this manner since a given pixel now comprises information relating to three different viewpoints. This is achieved by permutation of the color components for each viewpoint relative to one another in application of the following rule:

C for viewpoint No. 1 which, in the prior art used to be contained entirely in the first pixel P1, the red component R remains in place (0) while the green component G is shifted one pixel to the right (+1) and the blue component B is shifted two pixels to the right (+2) (triplet TR1);

C for viewpoint No. 2 which, in the prior art used to be contained entirely in the second pixel P2, the green component G remains is shifted one pixel to the left (−1) and the blue component B stays in place (0) and the red component R is shifted two pixels to the right (+2) (triplet TR2);

C for viewpoint No. 3 which, in the prior art used to be contained entirely in the third pixel P3, the blue component B is shifted two pixels to the left (−2), the red component R stays in place (0) and the green component G is shifted one pixel to the right (+1) (triplet TR3); and C for viewpoint No. 4 which, in the prior art used to be contained entirely in the fourth pixel P4, the triplet TR4 is obtained by shifting the red component R two pixels to the left (−2), the green component G one pixel to the left (−1), and the blue component B stays in place (0)

.

This is represented in the tables in boxes in FIG. 1a in which the numbers NTR of the pixels on the screen correspond to the above-specified triplets TR1, TR2, TR3, and TR4 and in which the displacement DPC to be performed on the color components of the pixels to be displayed is represented by the above increments, whereas the position PPC of the pixels coming from the camera is given by PX4 for triplet TR1, PX3 for triplet TR2, PX2 for triplet TR3 and PX1 for triplet TR4. This corresponds to inversion of the elementary images (by groups of pixels equal in number to the number of viewpoints, in this case four), which inversion must be performed on playback from a raw image obtained by a cylindrical lens camera in order to obtain an orthostereoscopic image. Such inversion is described in above-mentioned U.S. Pat. No. 5,099,320.

Figure 1B:
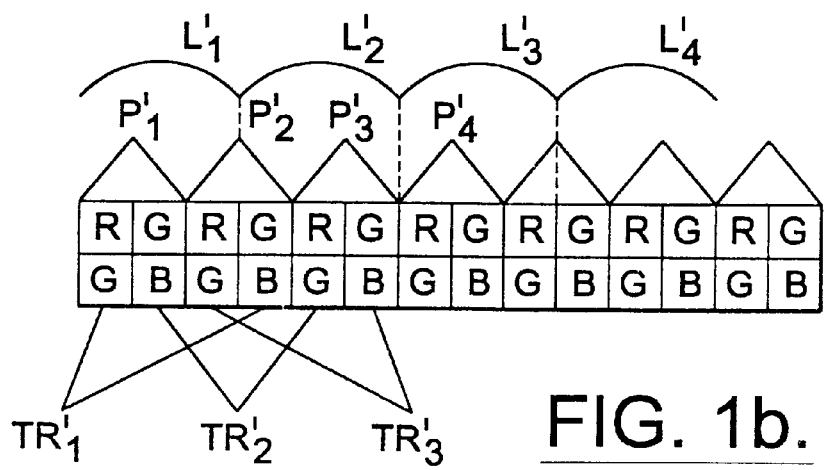
FIG. 1b shows the FIG. 1a device but with the pixels disposed in squares at a pitch of two pixels.

FIG. 1b corresponds to liquid crystal screens (1024× 1024) from General Electric or Thomson CSF. The color points of the pixels are distributed over a square, each square having a red color point R and a blue color point B on one diagonal and two half-intensity green color points G on the other diagonal. The processing to be performed is similar to the above, but at a pitch of two color points instead of three, i.e. as though the image was a two-color image. In this example, a number of viewpoints must be odd (in this case three) and each lens L'1, L'2, L'3, etc. must be of a width covering three color points in the pixel row. The pixel permutation corresponding to this case is shown in FIG. 1b.

Figure 2:
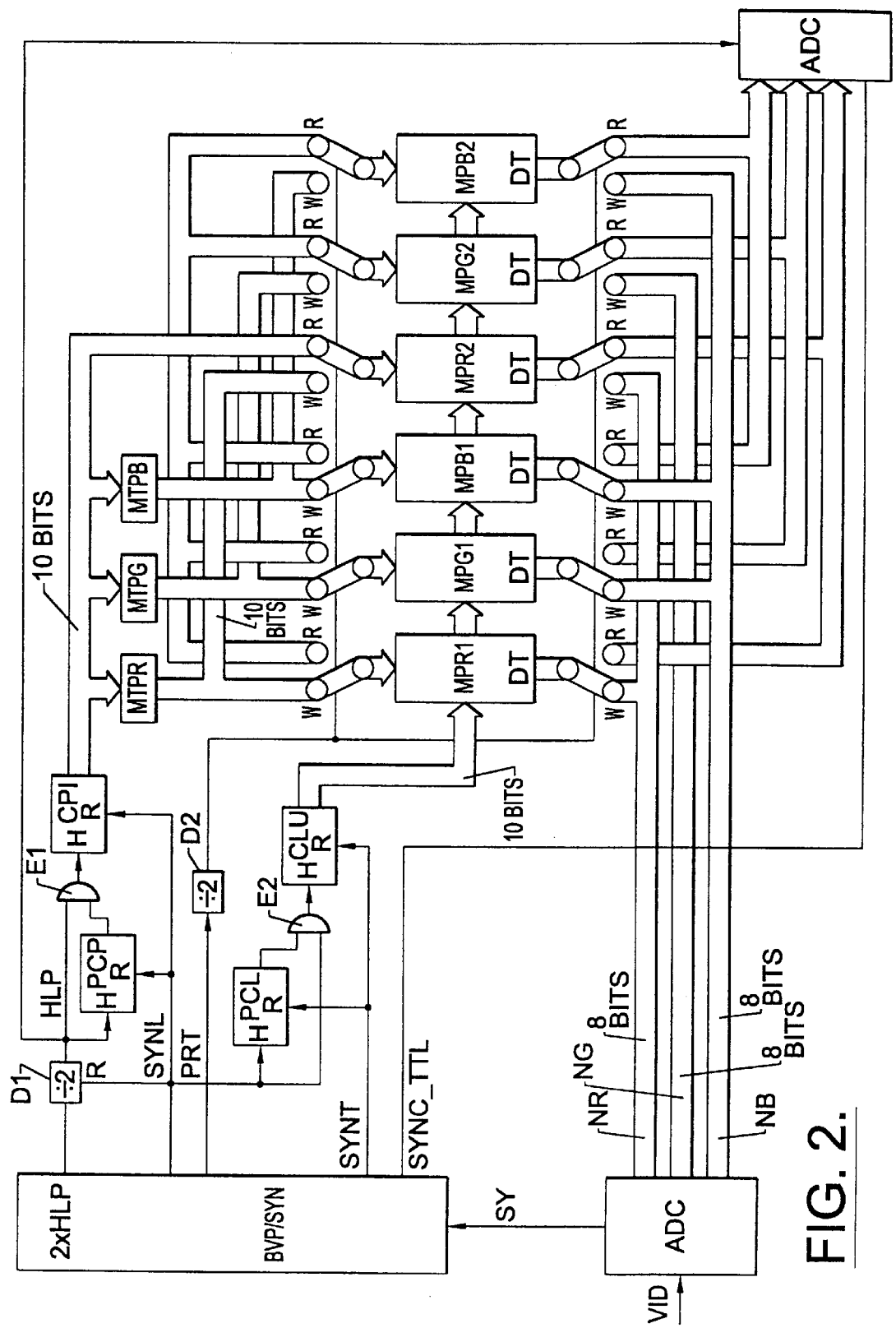
FIG. 2 is a block diagram of an address permutation device having a transcoding memory enabling the method of the invention to be performed.

In FIG. 2, an analog video signal VID is applied to the input of an analog-to-digital converter ADC which in conventional manner generates a synchronization signal SY and digital signals which are applied to a 3×8 bit bus for the red component NR, the green component NG, and the blue component NB. The synchronization signal SY is applied to the input of a phase locking and synchronization circuit BVP/SYN which produces as outputs simultaneously a pixel clock signal 2HLP at twice the pixel rate, a line synchronization signal SYNL, a field parity signal PRT, a field synchronization signal SYNT, and a synchronization signal SYNC TTL.

The pixel clock signal 2HLP is applied to the input of a divide-by-two circuit D1 which is reset to zero at the beginning of each line by the line synchronization signal SYNL. The pixel clock signal HLP produced at the output of D1 is applied to the input both of a pixel precounter PCP and to one of the inputs of an AND gate E1 whose other input receives the output from the pixel precounter PCP. The pixel precounter PCP is likewise reset to zero at the beginning of each line by the line synchronization signal SYNL, which also resets to zero the working pixel counter CPI whose input is constituted by the output of the AND gate E1. The output of the working pixel counter CPI is a 10-bit bus which feeds the address inputs of pixel memories, in particular a red pixel memory MPR1, a green pixel memory MPG1, a blue pixel memory MPB1, for storing a first image, and a second red pixel memory MPR2, a second green pixel memory MPG2, and a second blue pixel memory MPB2 for storing the second image. The output of the circuit CPI is connected to the address inputs of these memories both directly for reading purposes and indirectly via transcoding memories MTPR for the red color points, MTPG for the green color points, and MTPB for the blue color points for writing purposes. It will be observed that it is also possible to perform transcoding on reading. In which case, the transcoding memories MTPR, MTPG, and MTPB should be disposed between the output of the circuit CPI and the read addressing of the memories MPR1, MPG1, MPB1, MPR2, MPG2, and MPB2. The line synchronization signal is also applied to the count input of a line precounter PCL and to one of the inputs of an AND gate E2 whose other input is connected to the output of the counter PCL. The output of the AND gate E2 is applied to the count input H of a working line counter CLU. The circuits PCL and CLU are reset to zero by the field synchronization signal SYNT. The output from the working line counter circuit CLU is applied via a 10-bit to the write and read address inputs of the memories MPR1, MPG1, MPB1, MPR2, MPG2, and MPB2. For writing, the 8-bit buses carrying the digital color signals NR, NG, and NB feed the data inputs of the respective memories MPR1 and MPR2 for red (NR), MPG1, and MPG2 and green (NG), and MPB1 and MPB2 for blue (NB). The data of the above-specified memories is applied on reading to the data inputs of a digital-to-analog converter ADC synchronized by the signal SYNC TTL. The memories MRP1, MPG1, MPB1, MPR2, MPG2, and MPB2 are separated into two portions, e.g. for 1024 lines, the first 512 lines correspond to the first field of an image and the last 512 lines correspond to the second field. While an image is being written into the memories MPR1, MPG1, and MPB1 an image is being read from the memories MPR2, MPG2, and MPB2, and vice versa. As a result, the operations of writing and reading are separated. Switching between reading and writing is performed in response to a field parity signal PRT as divided by two by divider D2.

Figure 3:
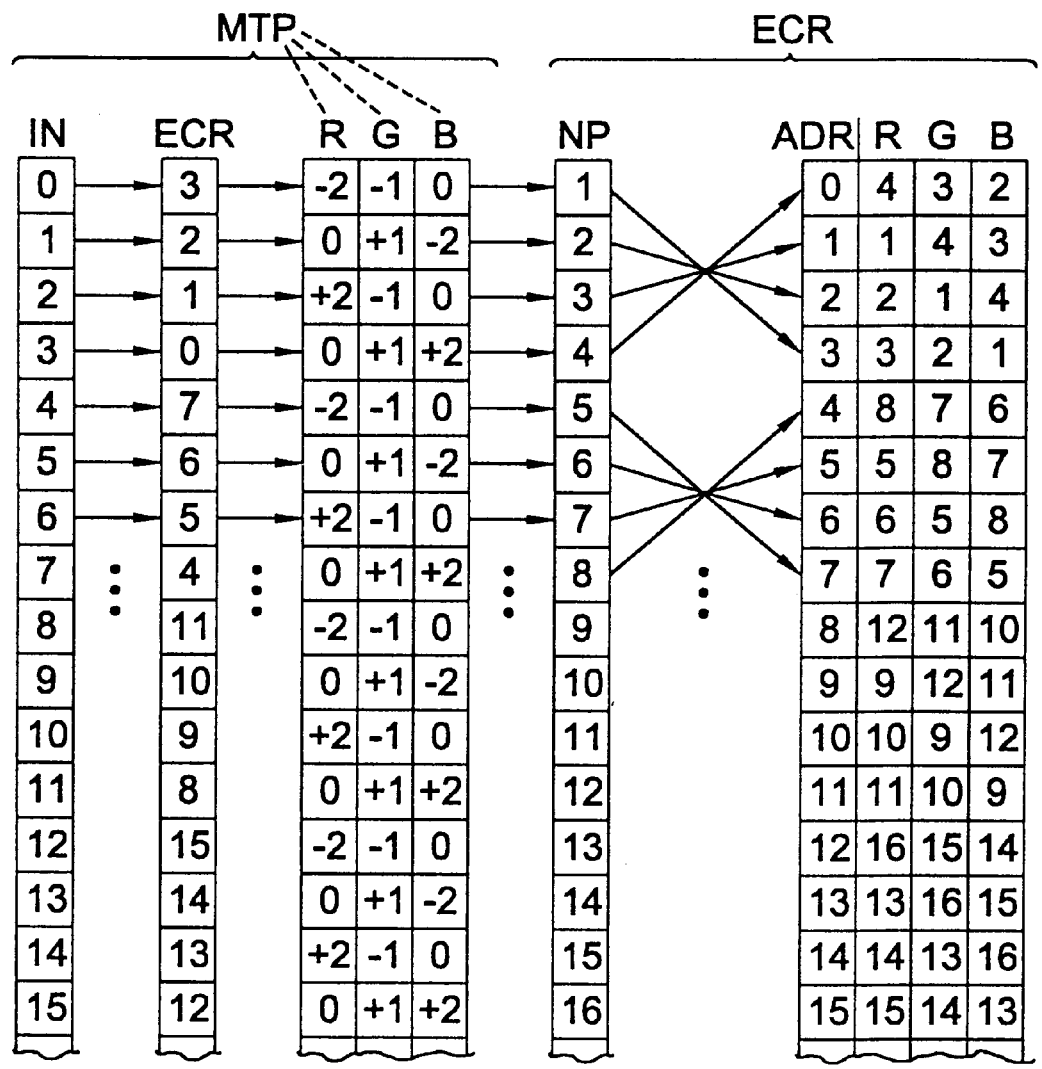
FIG. 3 shows tables illustrating, on the left, the permutations in the pixel transcoding memory for the red R, green G, and blue B components of an autostereoscopic image, and on the right, the result of writing the pixels into memory due to the action of the transcoding memory MTP.

The left portion of FIG. 3 shows the permutation table recorded in the pixel transcoding memories MTP (R, G, B). The first input address or address 0 corresponds on writing to address 3, i.e. triplet No. 4 TR4. As shown in FIG. 1, the offset is −2 for red, −1 for green, and 0 for blue. For the second address, 1, which corresponds in writing to triplet TR3, the respective offsets are 0 for red, +1 for green, and −2 for blue. For the third address, 2, which corresponds in writing to the triplet TR2, the offsets are +2, −1, and 0, and for the fourth address, No. 3, which corresponds in writing to triplet TR1 of address 0, the offsets are 0, +1, and +2. Similarly, the following input addresses 4, 5, 6, and 7 correspond in writing to triplets TR8 in address 7, TR7 in address 6, TR6 in address 5, and TR5 in address 4. The conversion table is the same as for the respective write address 3, 2, 1, and 0.

When writing in the pixel memories MTR, for a pixel number NP=1, and write address data ADR=0, the write address is equal to 4 for blue (P4), to 3 for green (P3), and to 2 for blue (P2). For the following triplet (TR3), the address is equal to 3 for red (P3), to 4 for green (P4), and to 1 for blue (P1). For the third triplet (TR2), corresponding to pixel PX3, the red component is to be written in the fourth position (P4), the green component in the first position (P1), and the blue component in the second position (P2). Finally, for the fourth pixel PX4 corresponding to triplet TR1, red goes for the first position (P1), green to the second position (P2), and blue to the third position (P3). For the following pixels with pixel numbers NP 5 to 8, the table can be deduced from the above table by adding the number 4, and so on.

It may be observed that the transcoding system described above is one in which the image is converted into digital form and then back into analog form. It may be observed that such transcoding can be done in analog form, in particular by integrating it in a CCD sensor in which a transcoding circuit is hard-wired between the pixel outputs of the image point columns and the inputs to a shift register so as to achieve the desired color permutation.

What is claimed is:

1. A device for displaying an autostereoscopic image, comprising:
    a video screen having an array of pixels disposed in columns and rows, each pixel including p color points arranged side by side along the pixel row, where p is an integer greater than 1, wherein the number N of viewpoints for the autostereoscopic image is different from p×n, where n is a non-zero integer, and
    a cylindrical lens array disposed in front of said video screen and through which the pixels may be viewed, wherein the lens array has lenses at a pitch covering more than p color points and less than p×N color points in the pixel row.

2. A device according to claim 1, wherein said lenses have a pitch in the row direction equal to the product of the color point pitch multiplied by the number of viewpoints.

3. A device according to claim 1, wherein p is equal to three and the number of viewpoints is equal to four.

4. A device according to claim 3, wherein the pitch of the lens in the row direction encompasses the width occupied by four juxtaposed color points.

5. A device according to claim 1, wherein p is equal to two and the number of viewpoints is equal to three.

6. A device according to claim 5, wherein the pitch of the lens in the row direction encompasses the width occupied by three juxtaposed color points.

7. A device according to claim 1, wherein said pixels are disposed in vertical columns and horizontal rows, and wherein the axis of said lenses is vertical.

8. A device for displaying an autostereoscopic image made up of image pixels having p color points, comprising:
    a video screen having an array of screen pixels disposed in columns and rows, each screen pixel including p color points arranged along the pixel row, where p is an integer greater than 1, wherein the p color points of each image pixel of each viewpoint are spread between p different screen pixels belonging to p different columns, and a cylindrical lens disposed in front of said video screen and through which the screen pixels may be viewed, wherein the lens array has lenses at a pitch covering more than p color points in the pixel row, and such that an observer sees said spread p color points of each image pixel belonging to each viewpoint in p successive lenses of the lens array.

9. A device according to claim 8, wherein the p color points of each screen pixel are arranged side by side along the pixel row.

10. A device according to claim 8, wherein the number of viewpoints for the autostereoscopic image is different from p×n where n is a non-zero integer.

11. A device according to claim 8, wherein said lenses have a pitch in the row direction equal to the product of the color point pitch multiplied by the number of viewpoints.

12. A device according to claim 8, wherein p is equal to three and the number of viewpoints is equal to four.

13. A device according to claim 12, wherein the pitch of the lens in the row direction encompasses the width occupied by four juxtaposed color points.

14. A device according to claim 8, wherein p is equal to two and the number of viewpoints is equal to three.

15. A device according to claim 14, wherein the pitch of the lens in the row direction encompasses the width occupied by three juxtaposed color points.

16. A device according to claim 8, wherein said pixels are disposed in vertical columns and horizontal rows, and wherein the axis of said lenses is vertical.

17. A device for displaying at least one viewpoint of an autostereoscopic image, said viewpoint having viewpoint pixels including p color points, said device comprising a video screen having an array of display pixels disposed in rows and columns, said rows and columns having a row direction and a column direction, said display pixels including p color points arranged side by side along the pixel row and having a color point pitch, the p color points of each viewpoint pixel of said viewpoint being spread between p color points which belong to p different display pixels, and which are spaced from each other by a distance taken along the pixel row direction which is equal to (p+q) times the color point pitch, with $q \neq n \times p$, with n being a non-zero integer.

18. A device according to claim 17, wherein p=2 and q=1.

19. A device according to claim 17, wherein p=3 and q=1.

* * * * *

UNITED STATES PATENT AND TRADEMARK OFFICE
CERTIFICATE OF CORRECTION

PATENT NO. : 5,936,607
DATED : August 10, 1999
INVENTOR(S) : Allio

It is certified that error appears in the above-identified patent and that said Letters Patent is hereby corrected as shown below:

Title page, after item [76], inventor: Pierre Allio, 81, rue de la Mare, 75020 Paris, France, insert -- [*] The term of this Patent shall not extend beyond the expiration date of U.S. Patent No. 5,808,599--

In the Related U.S. Application Data, on the Title page, item [63] after Pat. No. 5,808,599, insert --which was a National Phase Entry of PCT/FR94/ 00470 filed April 26, 1994--.

Signed and Sealed this

Thirtieth Day of May, 2000

Attest:

Q. TODD DICKINSON

*Attesting Officer*                *Director of Patents and Trademarks*